US009412475B2

(12) United States Patent
Lee et al.

(10) Patent No.: US 9,412,475 B2
(45) Date of Patent: Aug. 9, 2016

(54) APPARATUS FOR TRANSFERRING A FUEL ROD FOR TESTING

(71) Applicant: KEPCO NUCLEAR FUEL CO., LTD., Daejeon (KR)

(72) Inventors: Ju Young Lee, Chungcheongnam-do (KR); Chang Hwan Hwang, Daejeon (KR); Hung Soon Chang, Daejeon (KR); Soon Ki Guk, Daejeon (KR); Tae Hyung Na, Daejeon (KR); Ui Jea Lee, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 500 days.

(21) Appl. No.: 14/149,879

(22) Filed: Jan. 8, 2014

(65) Prior Publication Data

US 2014/0192943 A1 Jul. 10, 2014

(30) Foreign Application Priority Data

Jan. 8, 2013 (KR) .................. 10-2013-0002090

(51) Int. Cl.
*G21C 17/07* (2006.01)
*G21C 17/00* (2006.01)

(52) U.S. Cl.
CPC .............. *G21C 17/002* (2013.01); *G21C 17/07* (2013.01)

(58) Field of Classification Search
CPC ................................ G21C 17/06; G21C 17/07
See application file for complete search history.

(56) References Cited

U.S. PATENT DOCUMENTS

| 3,264,741 | A | * | 8/1966 | Brebant | ................... | G01B 5/10 |
| | | | | | | 33/549 |
| 4,195,411 | A | * | 4/1980 | Gerkey | ................... | G21C 17/06 |
| | | | | | | 33/783 |
| 4,748,798 | A | * | 6/1988 | Udaka | ................... | G21C 21/02 |
| | | | | | | 29/723 |
| 5,009,835 | A | * | 4/1991 | Ahmed | ................... | G01M 3/202 |
| | | | | | | 376/251 |
| 5,023,046 | A | * | 6/1991 | Speight | ................... | G21C 17/06 |
| | | | | | | 294/119.3 |
| 5,112,566 | A | * | 5/1992 | Butzin | ................... | G21C 17/07 |
| | | | | | | 376/245 |
| 5,204,052 | A | * | 4/1993 | Walker | ................... | G21C 21/00 |
| | | | | | | 376/261 |
| 5,375,756 | A | * | 12/1994 | Haughton | .............. | B23K 9/038 |
| | | | | | | 228/10 |

FOREIGN PATENT DOCUMENTS

| KR | 10-1988-0004492 A | 6/1988 |
| KR | 10-1990-0012289 | 8/1990 |
| KR | 10-2006-0134959 A | 12/2006 |

* cited by examiner

*Primary Examiner* — Sean P Burke
(74) *Attorney, Agent, or Firm* — Rabin & Berdo, P.C.

(57) ABSTRACT

Disclosed is a fuel rod testing apparatus for a nuclear fuel assembly. The fuel rod testing apparatus includes a helium leakage testing chamber having a gate so that a fuel rod is horizontally loaded/unloaded and testing whether or not helium leaks from the fuel rod, a fuel rod upward/downward transfer unit that has first and second transfer sections located in front of the gate and horizontally installed apart from each other in order to guide the fuel rod loaded into or unloaded from the helium leakage testing chamber, and that vertically drives the first and second transfer sections, and a main frame that has a upper transfer section disposed in parallel in a lengthwise direction of the fuel rod upward/downward transfer unit and having an inclined face and a lower transfer section installed at a lower portion of the upper transfer section and having an inclined face.

6 Claims, 5 Drawing Sheets

APPARATUS FOR TRANSFERRING A FUEL ROD FOR TESTING

BACKGROUND OF THE INVENTION

1. Field of the Invention

The present invention relates to a fuel rod testing apparatus for a nuclear fuel assembly and, more particularly, to a fuel rod testing apparatus for effectively performing a helium leakage test and macrography on a fuel rod that is finally assembled as a unit part in the process of manufacturing the fuel rod.

2. Description of the Related Art

Nuclear reactors are facilities for artificially controlling a fission chain reaction of a fissionable material in order to use thermal energy generated from nuclear fission as power.

Referring to FIG. 1, a nuclear fuel assembly includes spacer grids 2 into which fuel rods are inserted, numerous guide thimbles 3 fixed to the spacer grids 2, an upper end fitting 3 fastened to upper ends of the guide thimbles 2, and a lower end fitting 4 fastened to lower ends of the guide thimbles 2. Each fuel rod is supported by dimples and springs formed on each spacer grid 2.

The fuel rod is made up of a cladding tube, end plugs, pellets, and springs. The fuel rod is manufactured by enriching uranium-235 of 2 to 5% to form a cylindrical nuclear fuel pellet of about 5 g, charging the pellets into the cladding tube, inserting the springs, and sealing the cladding tube using the end plugs.

In the process of charging and sealing the pellets into the cladding tube, the cladding tube is filled with an inert gas such as pressurized helium, thereby reducing and preventing oxidation of the pellets.

For example, a nuclear fuel rod having a structure capable of being effectively filled with helium is proposed in Korean Unexamined Patent Application Publication Nos. 10-2006-0134959 (published on Dec. 28, 2006) and 10-1988-0004492 (published on Jun. 4, 1988).

In this way, helium introduced into the fuel rod under pressure can reduce or prevent the oxidation of the pellets. Especially, the helium introduced under pressure in the fuel rod for a pressurized water reactor (PWR) functions to relieve compressive stress and creep of the cladding tube, which are generated due to pressure of external cooling water.

Thus, a process of testing for leakage of the helium after the fuel rod has been manufactured is required.

In regard to this, a method and apparatus for testing for leakage of helium from a nuclear fuel rod are proposed in Korean Unexamined Patent Application Publication Nos. 10-1990-0012289 (published on Aug. 3, 1990). Referring to FIG. 2, the apparatus for testing for leakage of helium from a nuclear fuel rod is provided with a testing chamber 16 having a sealed structure in which it is tested whether or not the helium leaks from the nuclear fuel rod, a first conveyer 36 disposed at one end of the testing chamber 16 to convey the fuel rod to be tested, a second conveyer 38 disposed inside the testing chamber 16, and a third conveyer 40 disposed at the other end of the testing chamber 16 to convey the tested fuel rod.

In the helium leakage testing apparatus, the fuel rod is conveyed by the first conveyer 36. Another fuel rod waits for testing outside the testing chamber 16. The fuel rods tested in the testing chamber 16 are discharged to the outside of the testing chamber 16 by the second conveyer 38 installed inside the testing chamber 16 and the third conveyer 40. The discharged fuel rods are transferred to the next process by a transfer line.

The fuel rods have a length of about four meters and are conveyed in a horizontal direction. For these reasons, to transfer the fuel rods to the next process in the testing chamber using the conveyer, a long transfer line is required, and thus a wide space for facilities is required. Consequently, efficiency of the process is reduced.

SUMMARY OF THE INVENTION

Accordingly, the present invention has been made keeping in mind the above problems occurring in the related art, and an object of the present invention is to provide a fuel rod testing apparatus for a nuclear fuel assembly, capable of effectively performing a helium leakage test and macrography on a fuel rod that is finally assembled as a unit part in the process of manufacturing the fuel rod and making efficient use of a space for facilities.

To achieve the aforementioned object, there is provided a fuel rod testing apparatus for a nuclear fuel assembly, which includes: a helium leakage testing chamber having a gate at one side thereof so that a fuel rod is horizontally loaded/unloaded in a lengthwise direction and testing whether or not helium leaks from the fuel rod; a fuel rod upward/downward transfer unit that has first and second transfer sections located in front of the gate and horizontally installed on upper and lower stages apart from each other in order to guide the fuel rod loaded into or unloaded from the helium leakage testing chamber, and that vertically drives the first and second transfer sections; and a main frame that has an upper transfer section disposed in parallel in a lengthwise direction of the fuel rod upward/downward transfer unit and having an inclined face toward the fuel rod upward/downward transfer unit, and a lower transfer section installed at a lower portion of the upper transfer section and having an inclined face in an opposite direction of the inclined face of the upper transfer section.

Here, the first and second transfer sections may each include at least one drive roller and a plurality of idle rollers.

Further, the fuel rod testing apparatus may further include a testing table installed adjacent to the lower transfer section, wherein the fuel rod undergoing a helium leakage test is transferred to the testing table via the lower transfer section.

Also, the upper transfer section may further include a stopper member that is allowed to protrude on a transfer path of the fuel rod.

In addition, the stopper member may include first and second stoppers that protrude upward from opposite ends of a lever pivotally installed on the upper transfer section, and a rotary driver rotating the lever. The first and second stoppers may be spaced apart a predetermined distance from each other, and protrude from a transfer face of the upper transfer section at different points of time.

According to the fuel rod testing apparatus of the present invention, the helium leakage testing chamber is used to test whether or not the helium leaks from the fuel rod, and the fuel rod upward/downward transfer unit has the first transfer section and the second transfer section located below the first transfer section in order to guide the fuel rod loaded into or unloaded from the helium leakage testing chamber, and vertically drives the first and second transfer sections. The main frame has the upper transfer section disposed in parallel in the lengthwise direction of the fuel rod upward/downward transfer unit and having the inclined face toward the fuel rod upward/downward transfer unit, and the lower transfer section installed below the upper transfer section and having the inclined face in the opposite direction of the inclined face of the upper transfer section. For the purpose of a helium leakage test and macrography for long fuel rods, the transfer path is provided in a three-dimensional space rather than a two-dimensional space. Thereby, the helium leakage test and macrography can be effectively performed, and a space for facilities required for processes is minimized so that spatial application can be maximized.

BRIEF DESCRIPTION OF THE DRAWINGS

The above and other objectives, features and advantages of the present invention will be more clearly understood from the following detailed description when taken in conjunction with the accompanying drawings, in which.

DESCRIPTION OF THE PREFERRED EMBODIMENTS

Reference will now be made in detail to an embodiment of the present invention with reference to the accompanying drawings.

Figure 1:
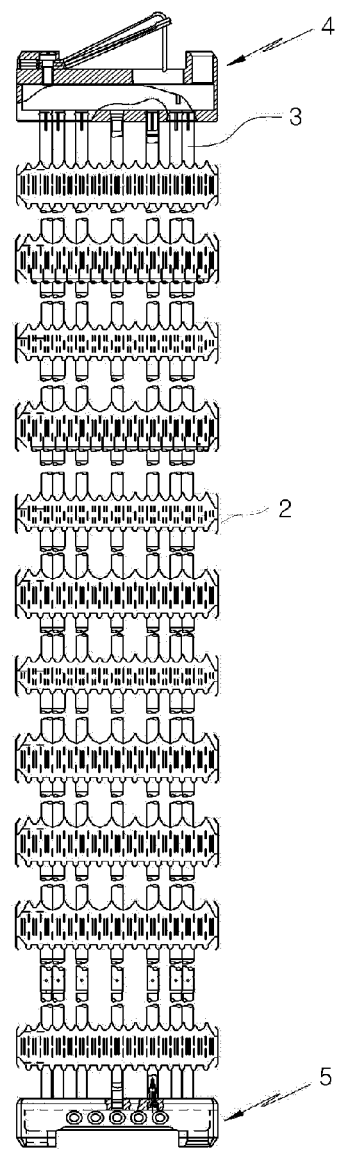
FIG. 1 shows a configuration of a typical nuclear fuel assembly.
Figure 2:
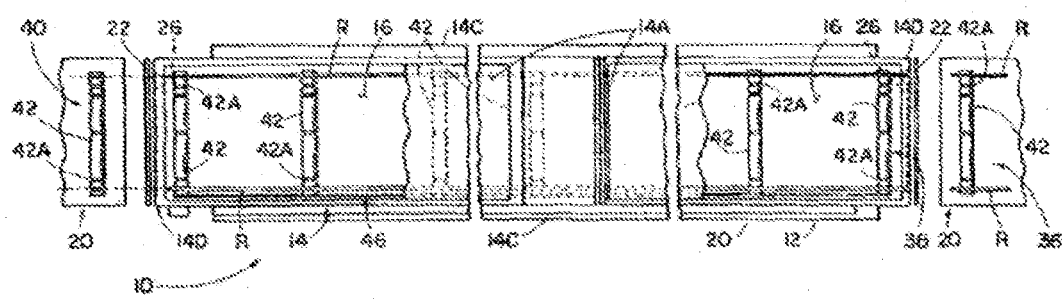
FIG. 2 is a plan view showing a conventional helium leakage testing apparatus for a fuel rod.
Figure 3:
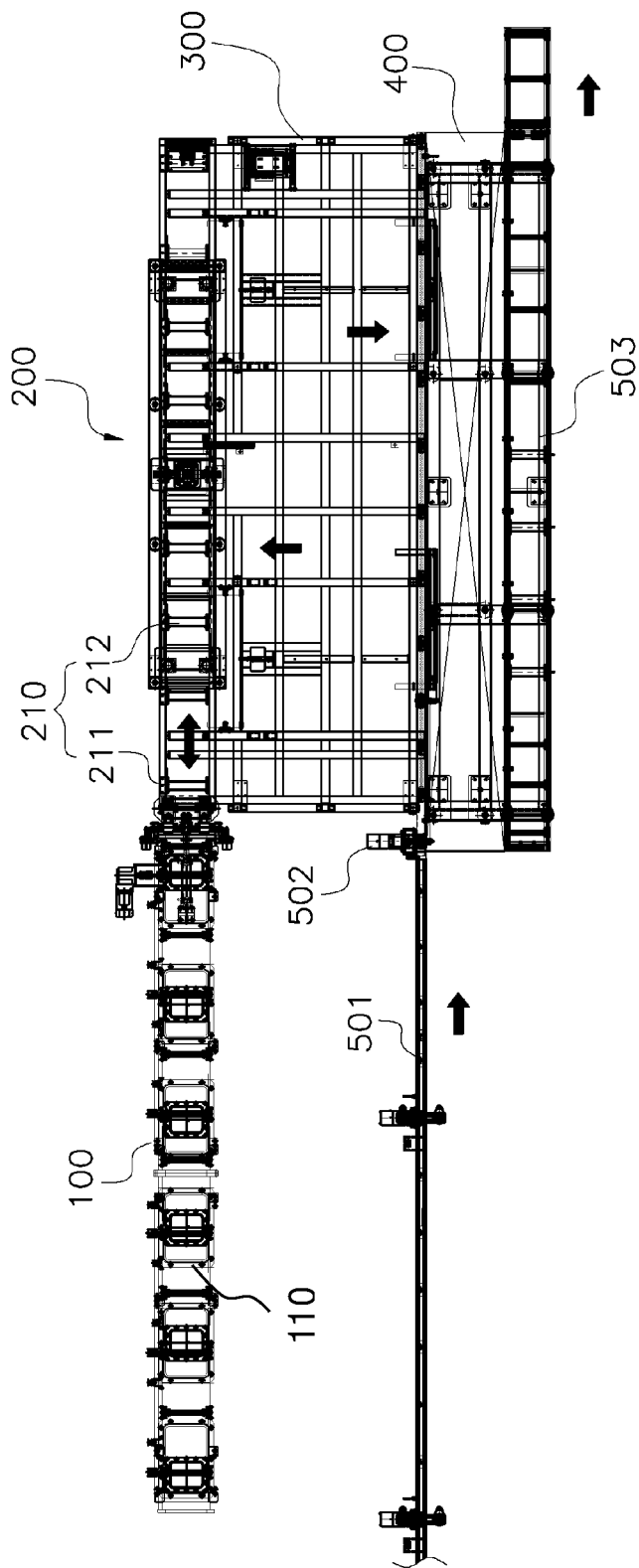
FIG. 3 is a plan view showing an entire configuration of a fuel rod testing apparatus for a nuclear fuel assembly according to an embodiment of the present invention.

Referring to FIG. 3, a fuel rod testing apparatus for a nuclear fuel assembly according to an embodiment of the present invention includes a helium leakage testing chamber 100 for testing whether or not helium leaks from a fuel rod, a fuel rod upward/downward transfer unit 200 that has a first transfer section 210 and a second transfer section 220 located at a lower portion of the first transfer section 210 in order to guide the fuel rod loaded into or unloaded from the helium leakage testing chamber 100 and that vertically drives the first and second transfer sections, and a main frame 300 that has a upper transfer section 310 disposed in parallel in a lengthwise direction of the fuel rod upward/downward transfer unit 200 and having an inclined face toward the fuel rod upward/downward transfer unit 200 and a lower transfer section 320 installed at a lower portion of the upper transfer section 310 and having an inclined face in an opposite direction of the inclined face of the upper transfer section 310.

The helium leakage testing chamber 100 is used to test whether or not the helium leaks from the fuel rod. To this end, a known helium leakage testing apparatus described in the related art may be used. The helium leakage testing chamber 100 is provided with a gate at one side thereof so that the fuel rod can be horizontally transported into or out of the chamber in a lengthwise direction.

Further, to allow the fuel rod to be transported into or out of the chamber, the helium leakage testing chamber 100 may be provided therein with a conveyer 110 that can transfer the fuel rod in cooperation with the fuel rod upward/downward transfer unit 200.

The fuel rod upward/downward transfer unit 200 is located in front of the gate of the helium leakage testing chamber 100, and includes the first and second transfer sections 210 and 220 that are horizontally installed apart from each other at upper and lower ends thereof in order to guide the fuel rod loaded into or unloaded from the helium leakage testing chamber 100 and that can be vertically driven.

In detail, the first transfer section 210 may be made up of a plurality of rollers 211 and 212, preferably at least one drive roller 211 and a plurality of idle rollers 212. The drive roller 211 may include a power moller in which a small motor and a speed reducer are mounted and driven. In the first transfer section 210, the drive roller 211 is driven to load the fuel rod, which is placed on the drive roller 211, into the helium leakage testing chamber 100.

Like the first transfer section 210, the second transfer section 220 is also made up of at least one drive roller and a plurality of idle rollers. The fuel rod loaded into the helium leakage testing chamber 100 can be unloaded by the second transfer section 220.

Figure 4:
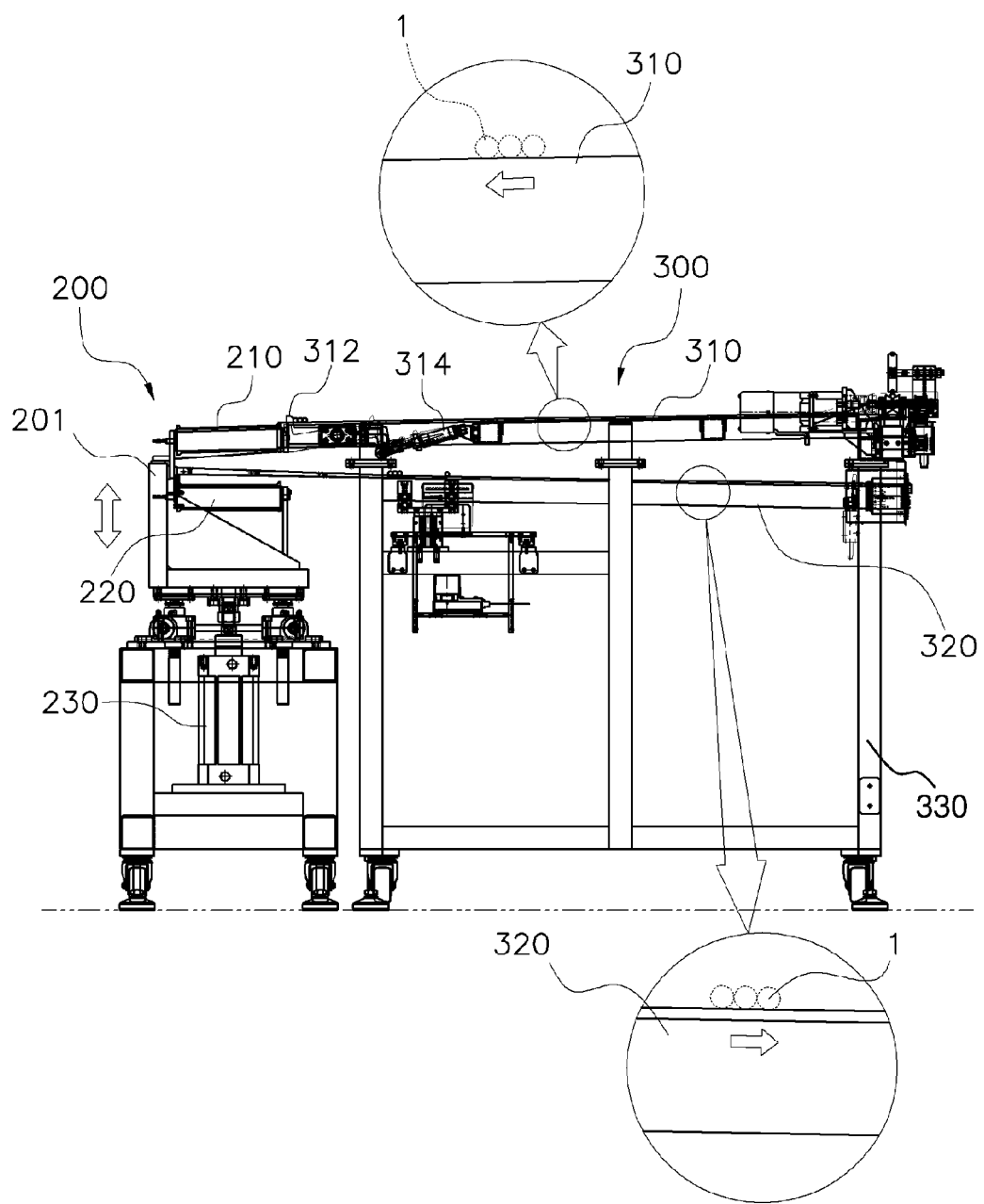
FIG. 4 is a side view showing a fuel rod upward/downward transfer unit and a main frame in the fuel rod testing apparatus according to the embodiment of the present invention.

Referring to FIG. 4, the first transfer section 210 and the second transfer section 220 are disposed apart from each other in a vertical direction, and are supported on a guide bracket 201. The guide bracket 201 may be vertically driven by a drive unit 230 located at a lower portion thereof. The drive unit 230 may include a pneumatic or hydraulic cylinder or a driving motor.

The main frame 300 is a hexahedral beam structure 330 assembled with a plurality of beams, and has the upper transfer section 310 disposed in parallel in a lengthwise direction of the fuel rod upward/downward transfer unit 200 and having a predetermined inclination and the lower transfer section 320 installed at the lower portion of the upper transfer section 310 and having an inclination opposite to that of the upper transfer section 310.

The upper transfer section 310 has the inclined face toward the fuel rod upward/downward transfer unit 200. Thus, the fuel rod 1 located at the upper transfer section 310 is rolled toward the fuel rod upward/downward transfer unit 200 along the inclined face of the upper transfer section 310.

Figure 5:
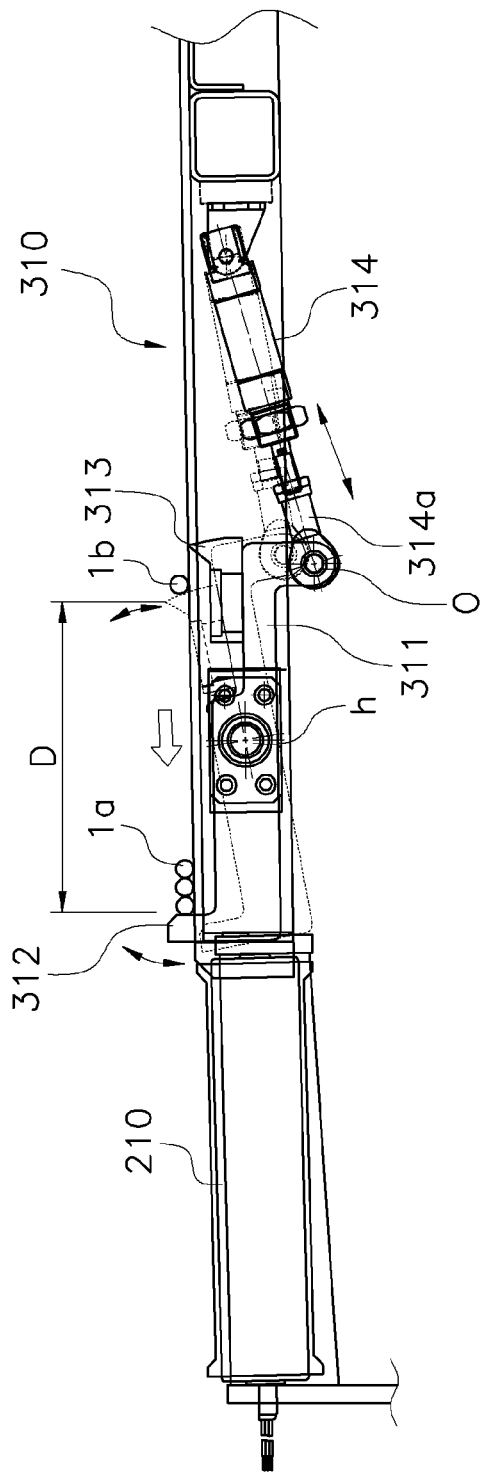
FIG. 5 is a view for describing an operation example of a stopper member installed on an upper transfer section in the fuel rod testing apparatus according to the embodiment of the present invention.

Referring to FIGS. 4 and 5, in the present embodiment, the upper transfer section 310 may be additionally provided with a stopper member that is allowed to protrude so as to stop the fuel rod 1 on a transfer path.

The stopper member may be made up of first and second stoppers 312 and 313 that protrude upward from opposite ends of a lever 311 fastened to the upper transfer section 310 by a hinge h, and a rotary driver for rotating the lever 311. According to an angle of rotation of the lever 311, a point of time at which the first stopper 312 protrudes is opposed to that at which the second stopper 313 protrudes.

For example, when the first stopper 312 protrudes from the upper transfer section 310, the second stopper 313 is located below a fuel rod transfer face of the upper transfer section 310, so that the fuel rod moves downward along the upper transfer section 310 without interfering with the second stopper 313. In contrast, when the second stopper 313 protrudes, the first stopper 312 is located below the fuel rod transfer face of the upper transfer section 310, so that the fuel rod moves along the upper transfer section 310 without interfering with the first stopper 312, and can be placed on the first transfer section 210.

The first stopper 312 and the second stopper 313 are spaced apart a predetermined distance D almost corresponding to a length of the lever 311. The distance D between the first stopper 312 and the second stopper 313 corresponds to the number of fuel rods that are placed on the first transfer section 210 at one time and are subjected to a helium leakage test.

The lever 311 is rotated by the rotary driver. For example, the rotary driver may include a cylinder 314. A cylinder rod 314a driven linearly by the cylinder 314 is fastened to the lever 311 by a second hinge O.

Thus, the lever 311 fastened to the cylinder rod 314a by the second hinge o is rotated about the hinge h by forward/backward movement of the cylinder rod 314a, and the first stopper 312 or the second stopper 313 protrudes upward from the transfer face.

In the stopper member configured in this way, after the first stopper 312 protrudes, the fuel rods of the first transfer section 210 are stopped on the inclined face by the first stopper 312. When the second stopper 313 protrudes, the fuel rods located behind the second stopper 313 are prevented from moving downward by the second stopper 313, and the first stopper 312 is lowered downward. Thus, only the fuel rods located within the distance D are placed on the first transfer section 210, are loaded into the helium leakage testing chamber 100, and are subjected to the helium leakage test.

When the first stopper 312 protrudes upward from the transfer face again, the fuel rods for the next helium leakage test move to the first stopper 312, and are on standby.

Referring to FIG. 4, the lower transfer section 320 is located below the upper transfer section 310, and has the inclined face in the opposite direction of the inclined face of the upper transfer section 310. Thereby, the fuel rods 1 located on the lower transfer section 320 are rolled along the inclined face of the lower transfer section 320.

Preferably, a testing table 400 is provided at a lower leading end of the lower transfer section 320. The fuel rods undergoing the helium leakage test are transferred to the testing table 400 via the lower transfer section 320.

The fuel rods collected on the testing table 400 are subjected to macrography. The fuel rods undergoing the macrography are transferred to the next process via a manual conveyer 503, and are loaded on a fuel rod loading unit. The fuel rods loaded on the fuel rod loading unit are assembled into a fuel rod assembly as a nuclear fuel assembly.

An operation of the fuel rod testing apparatus configured in this way will be described below.

The manufactured fuel rods are guided and transferred for the helium leakage test and the macrography one by one by a conveyor 501 driven by an induction motor. The transferred fuel rods are transferred to the upper transfer section 310 of the main frame 300.

The fuel rods transferred to the upper transfer section 310 move toward the fuel rod upward/downward transfer unit 200 along the inclination, and are stopped by the first stopper 312 that protrudes upward from the transfer face of the upper transfer section 310.

Next, when the first stopper 312 is lowered, the fuel rods located between the first stopper 312 and the second stopper 313 are placed on the first transfer section 210. The gate of the helium leakage testing chamber 100 is opened, and then the drive roller 211 of the first transfer section 210 is driven. Thereby, the fuel rods are loaded into the helium leakage testing chamber 100.

Each fuel rod may be marked with a bar code in which various pieces of information about a manufactured date, a type (enriched level) and so on are recorded for the purpose of managing the manufactured fuel rod. A bar code reader may be additionally installed on a side of the gate of the helium leakage testing chamber 100 so as to be able to read the bar code of the fuel rod to be tested in the process of loading the fuel rods into the helium leakage testing chamber 100.

After the fuel rods are completely loaded into the helium leakage testing chamber 100, the gate is closed. The helium leakage test is performed on the fuel rods in the helium leakage testing chamber 100. After the test is completed, the gate of the helium leakage testing chamber 100 is opened.

After the gate of the helium leakage testing chamber 100 is opened, the conveyer installed in the helium leakage testing chamber 100 is driven, and the second transfer section 220 of the fuel rod upward/downward transfer unit 200 is raised. The unloaded fuel rods are placed on the second transfer section 220 by driving of the drive roller of the second transfer section 220.

After the unloaded fuel rods are completely placed on the second transfer section 220, the second transfer section 220 is lowered below a height of the lower transfer section 320, and the fuel rods are transferred to and placed on the lower transfer section 320. The fuel rods transferred to the lower transfer section 320 move to the testing table 400 along the inclined face of the lower transfer section 320.

The fuel rods moving to the testing table 400 are subjected to the macrography, and then are transferred to the manual conveyer 503 by a given unit, and are transferred to the next process.

In this way, in the fuel rod testing apparatus, the fuel rods loaded/unloaded into/from the helium leakage testing chamber are tested in a three-dimensional space making efficient use of upper and lower spaces of the main frame. Thereby, the helium leakage test and the macrography are effectively performed, and the space for facilities required for the processes can be efficiently used.

Although an embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for transferring a fuel rod for testing, comprising:
   a testing chamber including
     a gate disposed at one side of the testing chamber so that the fuel rod is horizontally loaded/unloaded through the gate, and
     a conveyer installed inside the testing chamber;
   fuel rod upward/downward transfer unit disposed side by side with the testing chamber and including
     a first transfer section installed in a top portion of the fuel rod upward/downward transfer unit and configured to load the fuel rod into the testing chamber in a lengthwise direction,
     a second transfer section installed under the first transfer section and configured to unload the fuel rod from the testing chamber in the lengthwise direction,
     a guide bracket supporting the first and second transfer sections wherein an upper portion of the guide bracket is fixed to a side of each of the first and second transfer sections, and
     a drive unit disposed in a lower side of the fuel rod upward/downward transfer unit and coupled to a lower portion of the guide bracket, the drive unit configured to vertically drive the first and second transfer sections such that when the drive unit drives the first and second transfer sections downward, the first transfer section is placed at a height of the gate, and when the drive unit drives the first and second transfer sections upward, the second transfer section is placed at the height of the gate; and
   a main frame disposed in a lateral side of the fuel rod upward/downward transfer unit and including
     an upper transfer section disposed in a top portion of the main frame and configured to supply the fuel rod to the first transfer section, the upper transfer section having a first inclined face toward the fuel rod upward/downward transfer unit and a lower edge of the first inclined face adjacent to the first transfer section, a lower transfer section installed under the upper transfer section and configured to discharge the fuel rod from the second transfer section, the lower transfer section having a second inclined face in an opposite direction of the first inclined face of the upper transfer section and an upper edge of the second inclined face adjacent to the second transfer section, and a beam structure disposed in a lower portion of the main frame comprising a plurality of beams to support the upper transfer section and the lower transfer section.

2. The apparatus set forth in claim 1, wherein the first and second transfer sections each include at least one drive roller and a plurality of idle rollers.

3. The apparatus set forth in claim 1, further comprising
a testing table installed adjacent to the lower transfer section and configured to receive the fuel rod discharged from the second transfer section via the lower transfer section.

4. The apparatus set forth in claim 1, wherein the upper transfer section further includes a retractable stopper member configured to protrude on the first inclined face to stop the fuel rod.

5. The apparatus set forth in claim 4, wherein the retractable stopper member includes
a lever having a predetermined length and pivotally installed on the upper transfer section by a first hinge,
a first stopper and a second stopper formed to protrude upward from opposite ends of the lever, and
a rotary driver rotating the lever.

6. The apparatus set forth in claim 5, wherein the rotary driver is coupled with the lever by a second hinge.

* * * * *